United States Patent
Marathe et al.

(10) Patent No.: US 10,956,169 B2
(45) Date of Patent: Mar. 23, 2021

(54) METHOD AND SYSTEM FOR BOOT TIME OPTIMIZATION OF EMBEDDED MULTIPROCESSOR SYSTEMS

(71) Applicant: Texas Instruments Incorporated, Dallas, TX (US)

(72) Inventors: Yogesh Vikram Marathe, Bangalore (IN); Kedar Satish Chitnis, Bangalore (IN); Rishabh Garg, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 339 days.

(21) Appl. No.: 15/087,856

(22) Filed: Mar. 31, 2016

(65) Prior Publication Data

US 2017/0123810 A1  May 4, 2017

(30) Foreign Application Priority Data

Oct. 30, 2015  (IN) ............................ 5868/CHE/2015

(51) Int. Cl.
*G06F 9/4401* (2018.01)
(52) U.S. Cl.
CPC .......... *G06F 9/4401* (2013.01); *G06F 9/4405* (2013.01)
(58) Field of Classification Search
CPC ............................. G06F 9/4401; G06F 9/4405
See application file for complete search history.

(56) References Cited

U.S. PATENT DOCUMENTS

| | | | |
|---|---|---|---|
| 6,179,489 B1 | 1/2001 | So et al. | |
| 7,426,437 B2 | 9/2008 | Breed et al. | |
| 8,903,798 B2 | 12/2014 | El-Saban et al. | |
| 2011/0271086 A1* | 11/2011 | Ransom | G06F 9/4411 713/1 |
| 2013/0151829 A1* | 6/2013 | Amann | G06F 9/4401 713/2 |

(Continued)

FOREIGN PATENT DOCUMENTS

RU    2268829    1/2006

OTHER PUBLICATIONS

Hiroshi Kuroda, et al., "Advanced Vehicle Safety Control System", Hitachi Review, 2014, vol. 63, No. 2, pp. 61-66.

(Continued)

*Primary Examiner* — Kim Huynh
*Assistant Examiner* — Kevin M Stewart
(74) *Attorney, Agent, or Firm* — Brian D. Graham; Charles A. Brill; Frank D. Cimino

(57) ABSTRACT

An embedded multiprocessor system is provided that includes a multiprocessor system on a chip (SOC), a memory coupled to the multiprocessor SOC, the memory storing application software partitioned into an initial boot stage and at least one additional boot stage, and a secondary boot loader configured to boot load the initial boot stage on at least one processor of the multiprocessor SOC, wherein the initial boot stage begins executing and flow of data from the initial boot stage to the at least one additional boot stage is disabled, wherein the application software is configured to boot load a second boot stage of the at least one additional boot stage on at least one other processor of the multiprocessor SOC and to enable flow of data between the initial boot stage and the second boot stage.

20 Claims, 4 Drawing Sheets

(56) References Cited

U.S. PATENT DOCUMENTS

| | | | |
|---|---|---|---|
| 2014/0160291 A1 | 6/2014 | Schaffner | |
| 2014/0281092 A1* | 9/2014 | Jayakumar | G06F 11/0772 710/269 |
| 2015/0170435 A1* | 6/2015 | Ko | G07C 5/008 701/31.5 |
| 2016/0371094 A1* | 12/2016 | Higashiyama | G06F 9/445 |
| 2017/0015246 A1* | 1/2017 | Honghalli Devaraju | H04N 7/183 |

OTHER PUBLICATIONS

Rishabh Garg and Sivaraj R, TDA3xxx Secondary Bootloader (SBL), Texas Instruments, Draft v0.1, Jan. 2016, pp. 1-30.

Tu Honglei et al, "The Research on Software Metrics and Software Complexity Metrics", 2009 International Forum on Computer Science-Technology and Applications, Dec. 25-27, 2009, Chongqing, China, pp. 131-136.

Vikram Appia et al, "Surround View Camera System for ADAS on TI's TDAx SoCs", Texas Instruments, Inc., Oct. 2015, pp. 1-18.

Gaurav Singh et al, "Optimizing the Boot Time of Android on Embedded System", 2011 IEEE 15th International Symposium on Consumer Electronics, Jun. 14-17, 2011, Singapore, pp. 503-508.

Kedar Chitnis et al, "TI Vision SDK, Optimized Vision Libraries for ADAS Systems", Texas Instrument, Inc., Apr. 2014, pp. 1-12.

"New TDA3x SoC for ADAS Solutions in Entry- to Mid-Level Automobiles", Texas Instruments, Inc., SPRT708A, 2014, pp. 1-4.

N. Navet, "Controller Area Network", IEEE Potentials, vol. 17, Issue 4, Oct./Nov. 1998, pp. 12-14.

Guanglin Ma et al, "A Real-Time Rear View Camera Based Obstacle Detection", Proceedings of the 12th International IEEE Conference on Intelligent Transportation Systems, St. Louis, MO, Oct. 3-7, 2009, pp. 408-413.

"TDA3x SoC Processors for Advanced Driver Assist Systems (ADAS) Technical Brief", Texas Instruments, Inc., SPRT704A, Oct. 2014, revised Oct. 2014, pp. 1-6.

Yogesh Marathe et al, "Boot Time Optimization Techniques for Automotive Rear View Camera Systems", 2016 IEEE International Conference on Consumer Electronics (ICCE), Las Vegas, NV, Jan. 7-11, 2016, pp. 81-84.

K. Kalaiyarasu and C. Karthikeyan, "Design of an Automotive Safety System using Controller Area Network", International Conference on Robotics, Automation, Control and Embedded Systems—RACE 2015, Feb. 18-20, 2015, Chennai, India, pp. 1-5.

* cited by examiner

METHOD AND SYSTEM FOR BOOT TIME OPTIMIZATION OF EMBEDDED MULTIPROCESSOR SYSTEMS

CROSS-REFERENCE TO RELATED APPLICATIONS

This application claims benefit of Indian Provisional Patent Application Serial No. 5868/CHE/2015 filed Oct. 30, 2015, which is incorporated herein by reference in its entirety.

BACKGROUND OF THE DISCLOSURE

Field of the Disclosure

Embodiments of the present disclosure generally relate to embedded multiprocessor systems, and more specifically relate to boot time optimization for applications executing on such systems.

Description of the Related Art

A new class of safety systems, referred to as advanced driver assistance systems (ADAS), has been introduced into automobiles to reduce human operation error. Such systems may provide functionality such as rear-view facing cameras, electronic stability control, and vision-based pedestrian detection systems. The boot time of an automotive safety system may be crucial for safety as well as important to the overall user experience.

For example, an automotive safety system such as a rear view camera system (RVCS) may be provided to show the rear view of the vehicle when the reverse gear of the vehicle is engaged. The RVCS may simply display the rear view or may include more intelligence to detect obstacles and provide visual and/or audible warnings to the driver. In either instance, the boot time of the RVCS is critical for safety and, if overly long, affects the overall user experience.

SUMMARY

Embodiments of the present disclosure relate to methods and apparatus for boot time optimization in embedded multiprocessor systems. In one aspect, an embedded multiprocessor system is provided that includes a multiprocessor system on a chip (SOC), a memory coupled to the multiprocessor SOC, the memory storing application software partitioned into an initial boot stage and at least one additional boot stage, and a secondary boot loader configured to boot load the initial boot stage on at least one processor of the multiprocessor SOC, wherein the initial boot stage begins executing and flow of data from the initial boot stage to the at least one additional boot stage is disabled, wherein the application software is configured to boot load a second boot stage of the at least one additional boot stage on at least one other processor of the multiprocessor SOC and to enable flow of data between the initial boot stage and the second boot stage.

In one aspect, a method for booting an embedded multiprocessor system is provided that includes boot loading an initial boot stage of application software of the embedded multiprocessor system on at least one processor of a multiprocessor system on a chip (SOC) comprised in the embedded multiprocessor system, wherein the initial boot stage begins executing and flow of data from the initial boot stage to a subsequent boot stage of the application software is disabled, boot loading, under control of the application software, the subsequent boot stage of the application software on at least one other processor of the multiprocessor SOC, and enabling flow of data between the early boot stage and the subsequent boot stage by the application software.

In one aspect, an automotive safety system is provided that includes a multiprocessor system on a chip (SOC), a camera coupled to the multiprocessor SOC, a memory coupled to the multiprocessor SOC, the memory storing application software partitioned into an early boot stage and a late boot stage, wherein the early boot stage is configured to capture video frames from the camera and to display the video frames on a display device and the late boot stage is configured to detect objects in the video frames, and a secondary boot loader configured to boot load the early boot stage on a master processor of the multiprocessor SOC, wherein the early boot stage begins executing and flow of data from the early boot stage to the late boot stage is disabled, wherein the application software is configured to boot load the late boot stage on at least one other processor of the multiprocessor SOC and to enable flow of data between the early boot stage and the late boot stage.

BRIEF DESCRIPTION OF THE DRAWINGS

Particular embodiments will now be described, by way of example only, and with reference to the accompanying drawings.

DETAILED DESCRIPTION OF EMBODIMENTS OF THE DISCLOSURE

Figure 1:
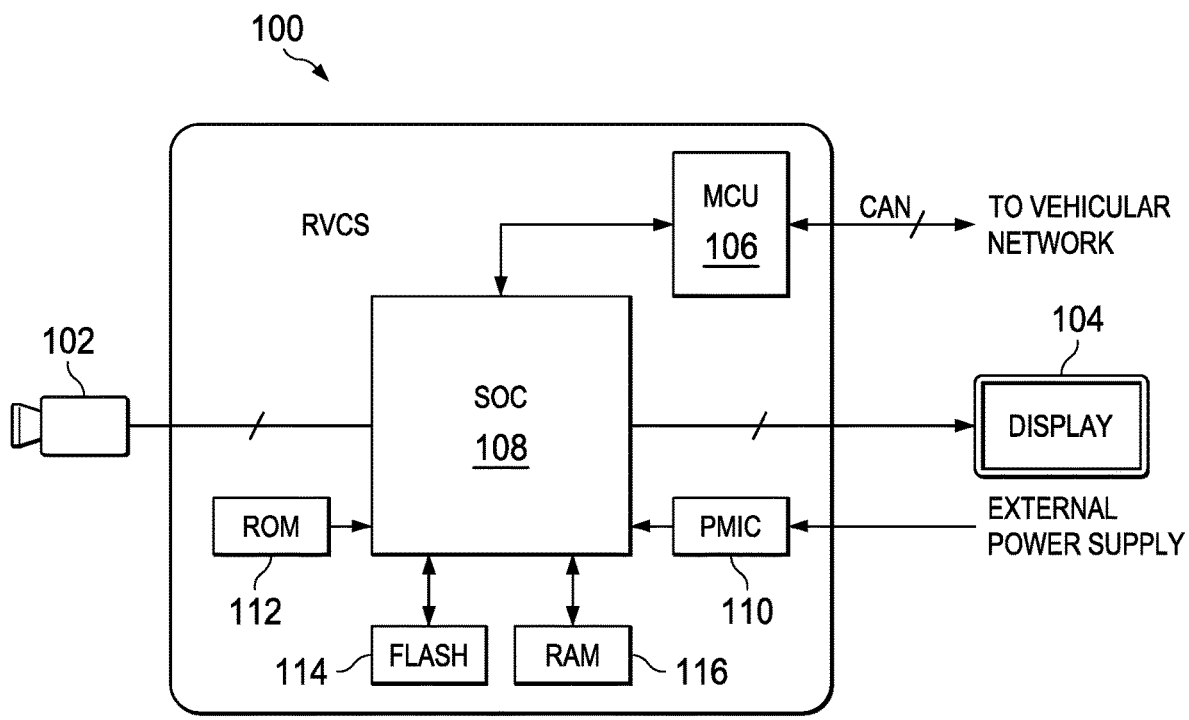
FIG. 1 is a block diagram of an example rear view camera system (RVCS)

Specific embodiments of the disclosure will now be described in detail with reference to the accompanying figures. Like elements in the various figures are denoted by like reference numerals for consistency.

Embodiments of the disclosure provide for boot time optimization for embedded multiprocessor systems such as advanced driver assistance systems (ADAS) that enable rapid boot loading of high priority portions of application software and delayed booting of lower priority portions. For example, in a rear view camera system (RVCS), boot priority may be given to display of the first frame of the rear view video while booting of other parts of the RVCS application such as object detection is given lower priority. In some embodiments, the application software manages the boot order and boot loading of the lower priority portions of the application.

Embodiments are explained herein in reference to an example RVCS. One of ordinary skill in the art will understand embodiments for other automotive safety systems and other embedded multiprocessor systems. In general, an automotive RVCS is a real time embedded system implemented as a hardware unit with external analog and digital interfaces. FIG. 1 is a block diagram of an example RVCS 100. The RVCS 100 includes a multiprocessor system-on-a-chip (SOC) 108, memory devices including read only memory 112, flash memory 114, and random access memory (RAM) 116, a microcontroller (MCU) 106, and a power management integrated circuit (PMIC) 110. The RVCS is coupled to a camera sensor 102 configured to capture a video sequence of the rear field of view of a vehicle. The RVCS 100 is also coupled to a display 104 configured to display the video sequence along with any overlays, warnings, etc. that may be generated as a result of processing the video sequence in the RVCS 100.

The ROM 112 may be used to store the power on reset (POR) boot code. The flash memory 114 may be used to store secondary boot code, i.e., a secondary boot loader, and application code. The MCU 106 serves as the communication interface between the SOC 108 and the vehicular network. As such, the MCU 106 hosts the network protocol stack, which is typically a Controller Area Network (CAN) stack. The multiprocessor SOC 108 hosts the RVCS application.

In the prior art, the RVCS of FIG. 1 is typically booted as follows. Upon POR, one of the processors of the multiprocessor SOC 108 is boot loaded by code stored in the ROM 112. After execution of the initial built in self tests (BIST), control is passed to a secondary boot loader read from the flash memory 114 into RAM 116. The secondary boot loader prepares the SOC 108 for executing the RVCS application, performing functions such as initializing essential phased lock loops and clocks, enabling peripherals, loading the multiprocessor application images into RAM 116, and booting the other processors in the SOC 108. After the other processors are booted, the secondary boot loader passes control to the processor which will execute the RVCS application. Note that all processors of the multiprocessor SOC 108 are booted before the RVCS application can begin execution. Thus, the display of the video stream from the camera sensor 102 cannot begin until all the processors are booted. The display delay incurred due to this boot time may be annoying to the driver of the vehicle and may also impact safety.

Figure 2:
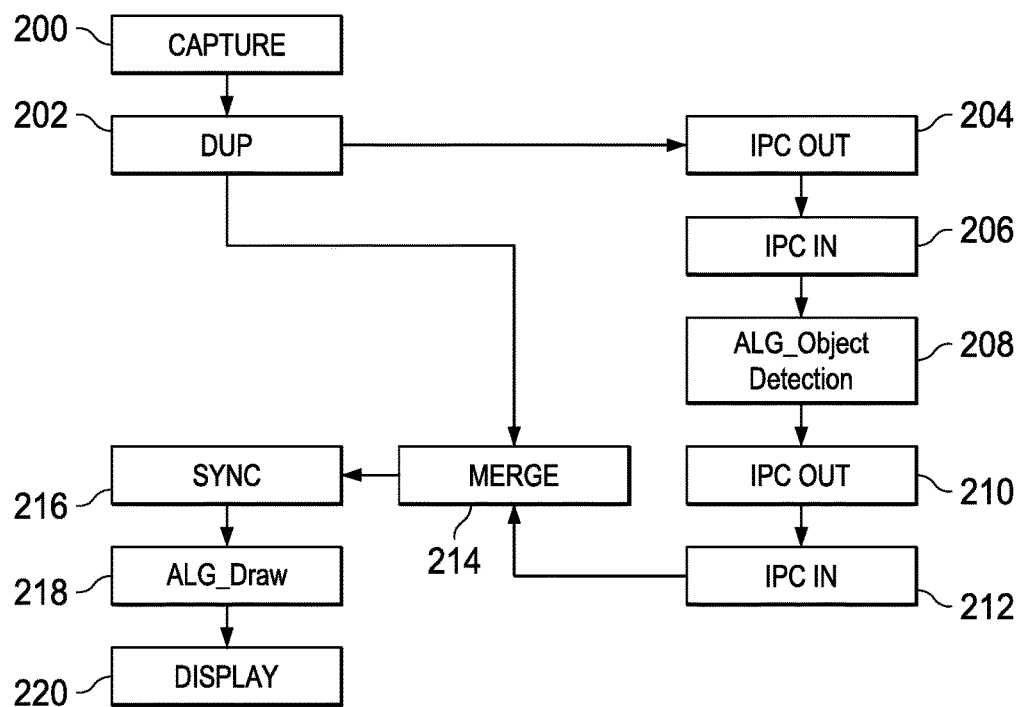
FIG. 2 illustrates the simplified data flow of an example prior art RVCS application.

FIG. 2 illustrates the simplified data flow of an example prior art RVCS application. In this example, the simplified data flow of the RVCS application is illustrated using the Vision Software Development Kit (SDK) available from Texas Instruments, Inc (TI). A brief overview of the Vision SDK is provided herein. Additional information may be found in K. Chitnis, et al., "TI Vision SDK, Optimized Vision Libraries for ADAS Systems," Texas Instruments, April, 2014, which is incorporated by reference herein.

The TI Vision SDK is a multiprocessor software development platform for TI's family of ADAS SOCs. The software framework allows users to create different ADAS application data flows involving video capture, video pre-processing, video analytics algorithms and video display. The Vision SDK is based on a framework referred to as the "Links and Chains" framework and the user API to this framework is called "Link API."

In general, links are software modules implementing a processing step in a video processing data flow. Each link executes as a separate thread and includes a message box that allows other links to communicate with that link. Each link also implements an interface which allows other links to directly exchange video frames and/or bits streams with the link. The unit of exchange between links is a system buffer. There are multiple types of system buffers, e.g., video frame, video bit stream, meta data, etc. A system buffer includes at least a buffer type field, a channel number identifying a video/processing channel in the system, a time stamp, a sequence number, a payload size, and a payload pointer.

The Link API enables creation, control, and connection of links. The control code is written on a single processor. Internally, the Link API uses inter-processor communication (IPC) to control links on different processors. Each link has a link identifier that indicates which processor executes the link. A connection of links is referred to as a chain. The chain represents the data flow of the application. Once a chain is initiated, video frames "flow" through the chain without need for user application intervention. Table 1 includes brief descriptions of some of the links provided by the Vision SDK.

TABLE 1

| Link Name | Description |
|---|---|
| IPC OUT | Get buffer information from previous link and send to IPC IN link on another processor |
| IPC IN | Get buffer information from IPC OUT link on another processor and send to next link on same processor |
| DUP | Get frame information from previous link and duplicate the information for a two or more next links. The DUP link keeps track of reference count before releasing the frames to the next links. |
| Merge | Get frame information from two or more previous links and "merge" into an input queue with multiple video channels for the next link. This link allows multiple sources to feed frames to the same consumer link. |
| Sync | Get multiple channels of input and synchronize the inputs based on time stamps. |
| Capture | Capture video frames from a video input port and output data to memory |
| Display | Read video frames from memory and display on a display device |
| Alg | Get video frames from memory, perform an algorithm, and output the results to the next link as meta data encapsulated in a system buffer. Algorithms are integrated into the Vision SDK by implementing an algorithm plugin associated with an Alg Link. The Alg plugin may encapsulate a complete algorithm or a stage of an algorithm. Stages of an algorithm can be spread across processors by forming a chain of Alg links. |

Figure 3:
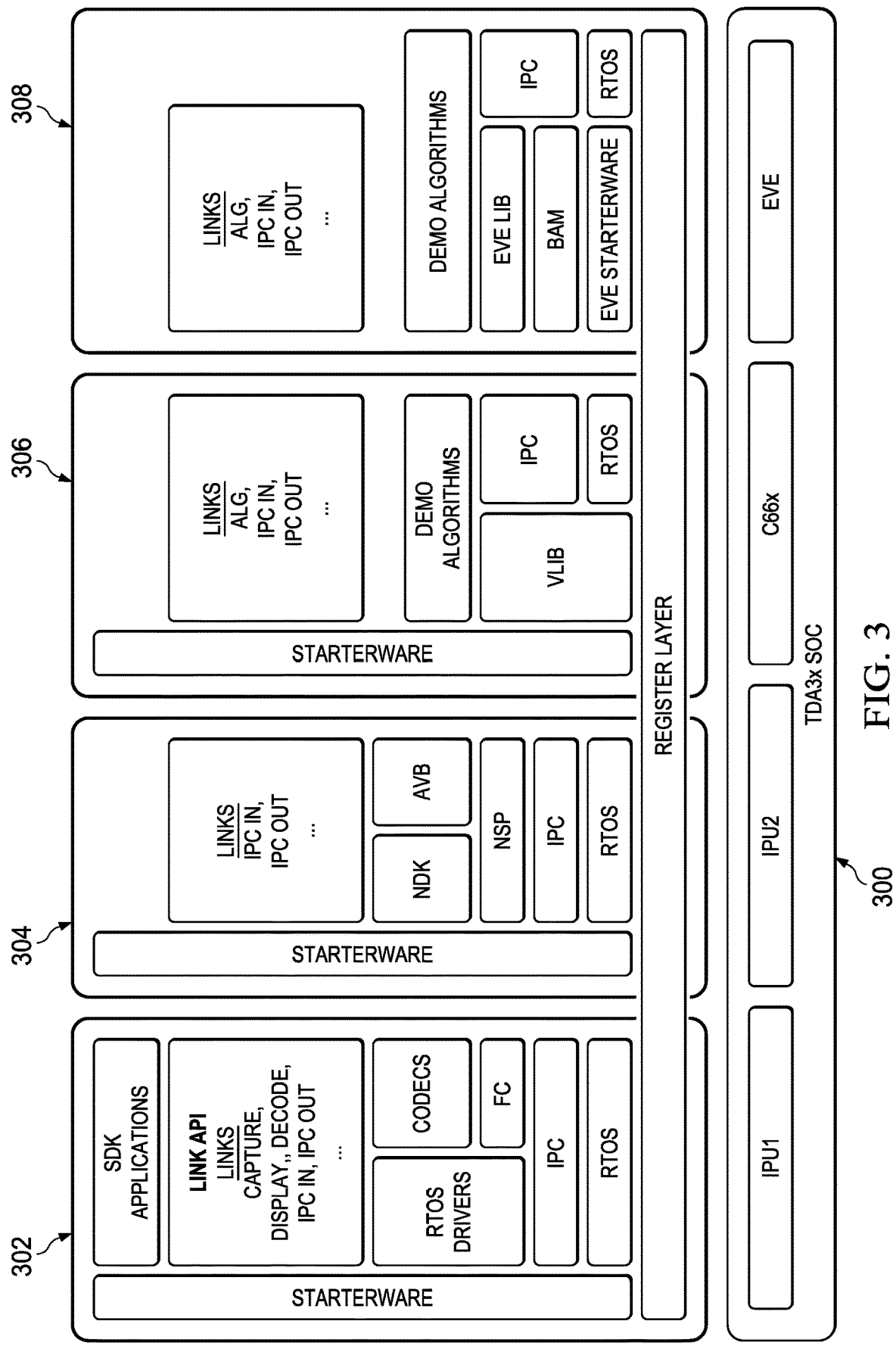
FIG. 3 is an example of a Vision Software Development Kit (SDK) software stack implemented on an example system on a chip (SOC)

FIG. 3 is an example of the Vision SDK software stack implemented on a configuration of the TDA3x SOC 300, one of the ADAS SOCs available from Texas Instruments. The SOC 300 of this example includes two image processor units (IPU), two digital signal processor (DSP) from the TMS320C66x family of signal processors available from Texas Instruments, and an embedded vision engine (EVE), also referred to as a vision processor or vision hardware accelerator. Additional information regarding the architecture of the TDA3x SOC may be found, for example, in "TDA3x SoC Processors for Advanced Driver Assist Systems (ADAS) Technical Brief," Texas Instruments, October 2014, which is incorporated by reference herein. Each of the software stacks 302, 304, 306, 308 illustrates the software executing on the respective processors of the SOC 300. Table 2 contains a brief description of the software layers.

TABLE 2

| Layer Name | Description |
| --- | --- |
| RTOS | A real time operating system providing features such as threads, semaphores, and interrupts. Queues and message passing between links is implemented using RTOS semaphores. |
| IPC | Software APIs for communicating between processors. Provides features such as multiprocessor heaps, multiprocessor linked lists, message queues, etc. |
| Starterware and RTOS Drivers | Video drivers, serial drivers, and board specific drivers. Starter ware is operating system agnostic software allowing higher software levels access to peripherals and subsystems of the corresponding processor. The secondary boot loader (SBL) described herein is an example of starterware. |
| Codecs | Video encode and decode APIs for various protocols |
| NSP, NDK, AVB | Networking stack support including TCP/IP, support for audio video bridging (AVB) |
| VLIB | Library of vision algorithm kernels optimized for DSP |
| EVE LIB | Library of vision algorithm kernels optimized for EVE |
| BAM | A block based acceleration manager that simplifies the effort to port existing image/vision algorithms developed on a computer to an embedded system. The BAM converts the processing flow of an algorithm to a block based flow more suitable for embedded processing. |
| Links | Implementations of individual links. A Link may be processor specific or common across processors. |
| Link API | API for creating, connection, and control of links on all processors. Used to create a chain of links to form a data flow for an application |
| Demo Algorithms | Example algorithms for demonstration to customers |
| Register Layer | Interface for accessing memory mapped registers |
| SDK Applications | User applications defined using the link API. For example, the example RVCS described herein is a user application. |

Referring again to FIG. 2, the depicted simplified data flow is explained assuming the RVCS 100 of FIG. 1 in which the SOC 100 is the SOC 300 of FIG. 3. In this data flow, the Capture link 200, the Dup link 202, the IPC OUT link 204 the IPC IN link 212, the Merge link 214, the Sync link 216, the Alg link 218, and the Display link 220 execute on IPU1 of the SOC 300. The IPC IN link 206, the Alg link 208, and the IPC OUT link 210 may execute on the C66x or the EVE of the SOC 300. The Capture link 200 captures frames from the camera sensor 102. The Dup link 202 provides duplicate frame information to both the merge link 214 and the IPC OUT link 204. The IPC OUT link 204 in conjunction with the IPC IN link 206 communicate the frame information from IPU1 to the Alg link 208 executing on the other processor. In this example, the Alg link 208 implements an algorithm plugin for object detection. Object detection may include, for example, traffic sign recognition, lane detection, and/or pedestrian detection.

The IPC OUT link 210 in conjunction with the IPC IN link 212 communicate the output of the Alg link 208 to the Merge link 214 on IPU1. The output of the Alg link 208 may be, for example, a list of detected objects including the coordinates of each object and the type of each object. The Merge link 214 merges the output of the Dup link 202 and the output of the Alg link 208 for consumption by the Alg link 218. In this instance, the Alg link 218 consumes both video frames from the Dup link 202 and algorithm output from the Alg link 208.

The Sync link 216 time synchronizes buffers from different channels. In this instance, the Sync link 216 matches the sources time stamps of video frames to metadata output by the Alg link 208 and forwards composite frames to the Alg link 218. A composite frame includes a video frame and the Alg link 208 output for that frame in a single buffer. In this example, the Alg link 218 implements a drawing algorithm. More specifically, the Alg link 218 receives composite frames and draws boundaries around detected objects in a video frame to visually indicate the detected objects. The Display link 220 displays the output of the Alg link 218 on the display 104.

As previously mentioned, in the prior art, all processors of the RVCS 100 are booted before the display of the video stream can begin. Further, as can be seen from the simplified data flow of FIG. 2, the initial frames are processed through all the links of the data flow before anything is shown on the display. In some embodiments, the data flow of the RVCS application is divided into two boot stages, referred to herein as an early boot stage and a late boot stage. The early boot stage includes the application data flow needed for capture and display of the video stream from the camera sensor 102 while the late boot stage includes the remaining data flow of the RVCS application. The early boot stage can booted and begin execution before the late boot stage is initiated.

Figure 4:
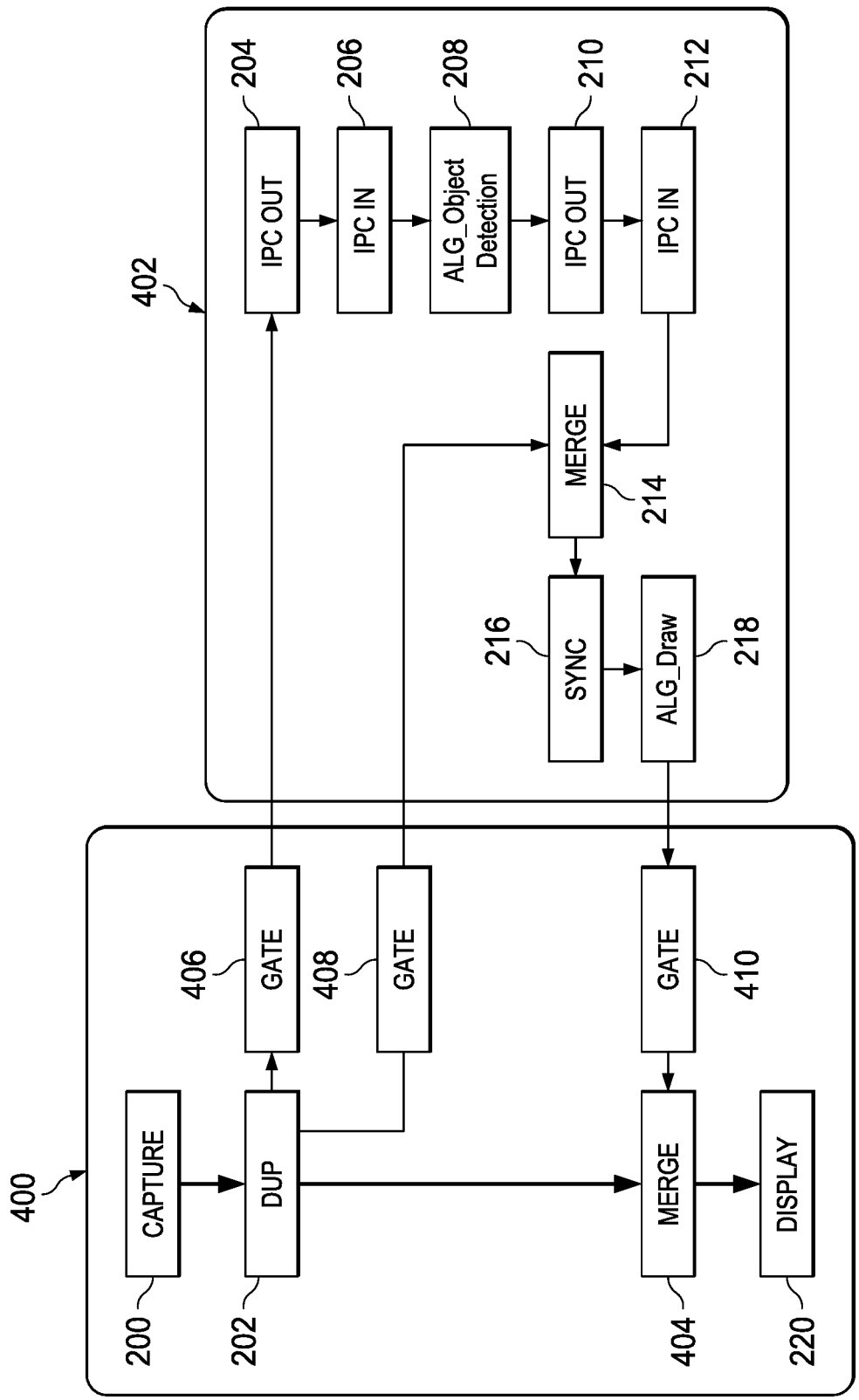
FIG. 4 is illustrates the simplified data flow of FIG. 2 divided into an early boot stage and a late boot stage.

FIG. 4 illustrates the simplified data flow of FIG. 2 divided into an early boot stage 400 and a late boot stage 402. The early boot stage 400 includes the Capture link 200, the Dup link 202, and the Display link 220. The remainder of the links is assigned to the late boot stage 402. To facilitate the division of the data flow into boot stages, Gate links 406, 408, 410 are added to the early boot stage 400 to control the flow of data between links in the early boot stage 400 and links in the late boot stage 402. A Gate link operates as a "gate" to control of the flow of data from a previous link to the next link. For example, Gate link 406 controls the data flow from the Dup link 202 to the IPC OUT link 204. A Gate link has two states: an on state in which data is allowed to flow through the link, and an off state in which data is not allowed to flow through the link. Further, when a Gate link is instantiated, the link is in the off state by default. The RVCS application can issue a command to change the state of a Gate link to the on state.

In addition, a Merge link 404 is added to the early boot stage 400 to merge the output of the Alg link 218 and the Dup link 202 when the Gate link 410 is in the on state. When the Gate link 410 is in the off state, the link 410 forwards the channel received from the Dup link 202 to the Display link 220. When the Gate link 410 is instantiated in the early boot stage 400, the application provides information regarding any input links, including any links that will not be instantiated until the application boot loads the late boot stage 402, to the Gate link 410. During the boot loading of the early boot stage 400, the Merge link 404 receives all the information needed to start receiving data from the Gate link 410 at any time the Gate link 410 is changed to the on state by the application.

In addition to splitting the data flow of the RVCS application into an early boot stage and a late boot stage, the RVCS application includes functionality to boot load the late boot stage. That is, once the early boot stage of the application is executing, the application initiates the boot loading of the late boot stage. In some embodiments, the secondary boot loader (SBL) is modified to boot only those processors needed by the early boot stage of the application and to include interfaces, i.e., application program interfaces (APIs), to allow the application to boot other processors and enable peripherals as needed for the late boot stage. More specifically, the SBL may be split into three layers: an SBL library layer, an SBL Utility layer, and an SBL application.

The SBL library layer contains APIs that may be used by an application for booting processors and for parsing and loading images. This library layer may be used by both the application and the boot loader application. The SBL utility layer contains, for example, APIs for communicating between boot media and the master processor, i.e., the processor executing the application, APIs for data transfer, and APIs for interacting with various peripherals. This layer is used only by the boot loader application. The SBL application contains the secondary boot loader application that loads and boots the application image, e.g., the early boot stage of the application. An example of such an SBL is described in R. Garg and S. R., "TDA3xx Secondary Bootloader (SBL)", Texas Instruments, January, 2016, pp. 1-30, which is incorporated by reference herein.

Figure 5:
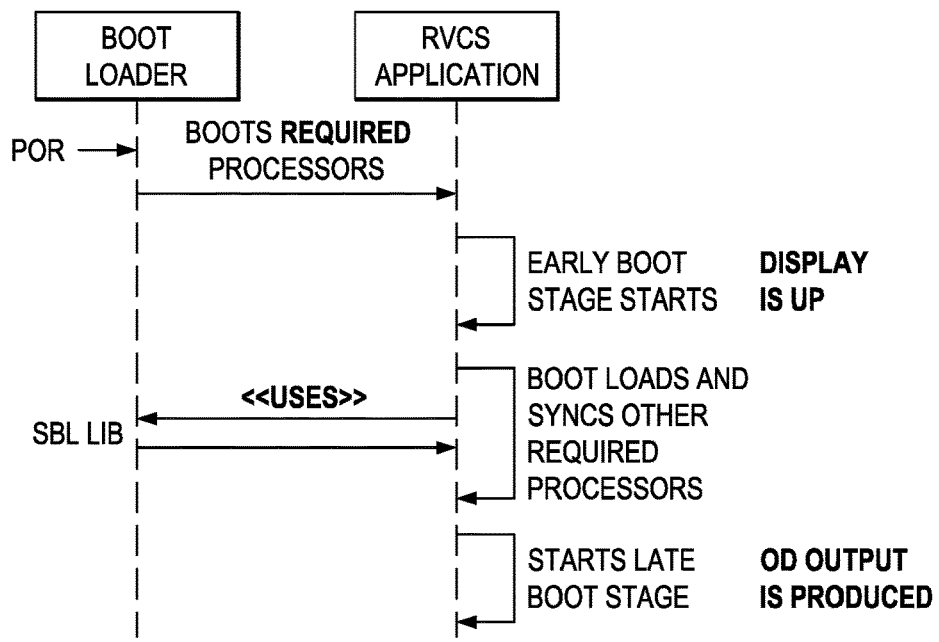
FIG. 5 is a sequence diagram illustrating an optimized boot process for the RVCS of FIG. 1.

FIG. 5 is a sequence diagram illustrating the boot process of the RVCS 100 using the modified SBL. Upon POR, the processor that will execute the RVCS application is boot loaded by the ROM boot loader. After execution of the initial built in self tests (BIST), control is passed to the SBL application read from the flash memory 114 into RAM 116. The SBL application boots the processors needed for the initial boot stage of the RVCS application, e.g., IPU1 of SOC 300 (the master processor) and the processor hosting the CAN stack. The SBL application also enables any peripherals needed for the initially boot stage, loads the image for the early boot stage of the RVCS application into RAM 116, and initiates execution of the early boot stage code. Upon execution of the early boot stage code, display of video frames begins. Note that at this point, all of the Gate links (FIG. 4) are in the off state.

The RVCS application then boots loads and synchronizes the other processors required for the late boot stage using the APIs of the SBL library. Finally, the RVCS application starts execution of the late boot stage. As part of starting the late boot stage, the RVCS application sends commands to each of the Gate links (FIG. 4) to change the state of these links to on, allowing data to flow between the early boot stage links and the late boot stage links.

The RVCS examples above illustrate optimized booting in which an automotive safety application is divided into two boot stages. One of ordinary skill in the art will understand embodiments in which the data flow of an automotive safety application is divided into more than two boot stages such that the initial boot stage has the highest boot priority, i.e., will be boot loaded first, and the remaining boot stages have lower boot priorities. For each boot stage, the processors needed for executing the functionality of the application assigned to the boot stage are booted, if not already booted during an earlier boot stage. In addition, booting of the remaining stages is managed by the safely application.

Figure 6:
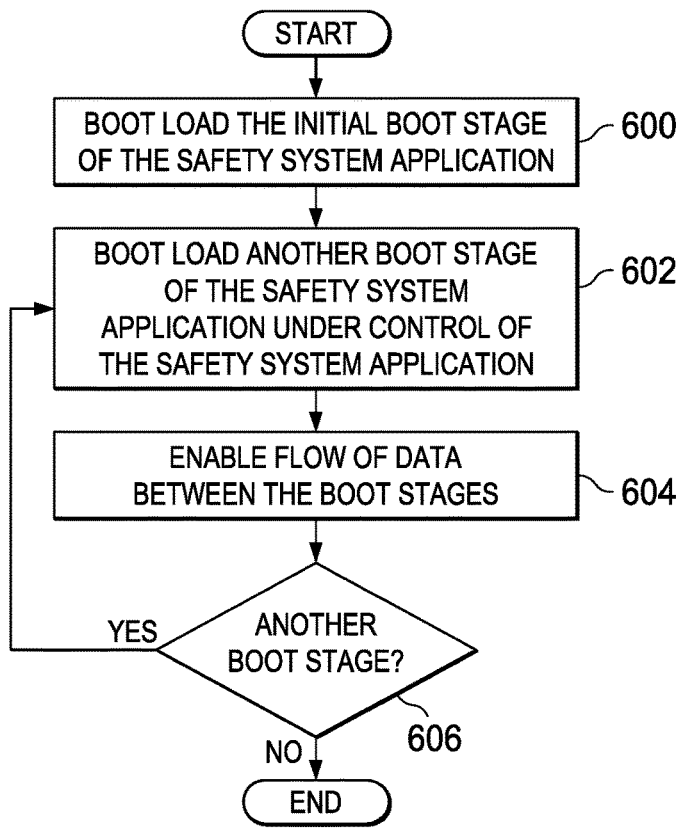
FIG. 6 is a flow diagram of a method for booting an automotive safety system.

FIG. 6 is a flow diagram of a method for booting an automotive safety system in which the application software is partitioned into multiple boot stages. The application software is partitioned such that functionality of the application that needs to come on line as soon as possible, e.g., capturing and displaying video frames, is included in the boot stage that will be boot loaded first. The remaining functionality of the application software is partitioned into boot stages that are boot loaded under control of the application software.

The flow of data between boot stages is controlled by software gate modules, e.g., the above described Gate link, that enable and disable data flow through the modules as per commands from the application software. When a boot stage is boot loaded, any gate modules in the boot stage may be disabled by default. The application may then enable gate modules as needed to allow the flow of data between boot stages.

As shown in FIG. 6, initially the initial boot stage of the safety system application is boot loaded 600 onto one or more processors of a multiprocessor SOC. Any peripherals needed for execution of the initial boot stage are also enabled. The initial boot stage begins execution. At this point, data flow between the initial boot stage and any subsequent boot stages is disabled. That is, any gate modules in the initial boot stage are configured to not allow the flow of data through the modules.

The safety system application then boot loads 602 another boot stage of the application on one or more other processors of the multiprocessor SOC. Any peripherals needed for execution of the initial boot stage that are not already enabled are also enabled. That is, the boot loading of the next boot stage is controlled by the safety system application. The safety system application may manage the boot loading of the next boot stage using an API of a secondary boot loader such as the secondary boot loader previously described herein. The next boot stage begins execution. At this point, data flow between the newly booted boot stage and the initial boot stage and between the newly booted boot stage and any boot stages yet to be boot loaded is disabled. That is, the gate modules in the newly booted boot stage are configured to not allow the flow of data through the modules.

The safety system application then enables 604 the flow of data between the initial boot stage and the newly booted boot stage. That is, the safety system application sends a command to any gate modules controlling the flow of data between the two boot stages that enables the flow of data through those modules. Any gate modules in the two boot stages that control the data flow to boot stages not yet boot loaded are not enabled. The safety system application 604 then repeats the boot loading of another boot stage and enabling of data flow for any remaining boot stages 606.

Note that for any boot stage boot loaded after the second boot stage, the flow of data is enabled as needed between that boot stage and any of the previously boot loaded boot stages.

Other Embodiments

While the disclosure has been described with respect to a limited number of embodiments, those skilled in the art, having benefit of this disclosure, will appreciate that other embodiments can be devised which do not depart from the scope of the disclosure as disclosed herein.

For example, embodiments have been described herein in which the automotive safety system is a RVCS. One of ordinary skill in the art will understand embodiments for other automotive safety systems such as, for example, back over prevention, parking assistance, front collision warning, and automatic braking. For example, for other camera based safety systems, the early boot stage may be similar to that of the RVCS example in order to start displaying the video stream(s) quickly and the late boot stage may include the remainder of the safety system application software.

In another example, embodiments have been described herein in relation to embedded multiprocessor systems used for automotive safety. One of ordinary skill in the art will understand embodiments for other embedded multiprocessor systems such as, for example, automotive infotainment, heads up displays, and consumer electronics such as wearable sports cameras.

In another example, embodiments have been described herein in relation to a TDA3x multiprocessor SOC and the Vision SDK. One of ordinary skill in the art will understand embodiments for other multiprocessor SOCs and/or other software development frameworks for multiprocessor software development.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular system components. As one skilled in the art will appreciate, components in multiprocessor systems may be referred to by different names and/or may be combined in ways not shown herein without departing from the described functionality. This document does not intend to distinguish between components that differ in name but not function. In the description and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A system comprising:
   a multiprocessor system on a chip (SOC) comprising at least one first processor and at least one second processor;
   a memory coupled to the multiprocessor SOC, the memory storing application software partitioned into:
      a first boot stage comprising:
         a duplication link;
         a gate link; and
         a merge link;
         the first boot stage configured to boot load onto the at least one first processor; and
      a second boot stage comprising an algorithm link, the second boot stage configured to boot load onto the at least one second processor;
   while boot loading the second boot stage:
      the gate link is configured to block video data from the algorithm link; and
      the merge link is configured to:
         receive first video data from the duplication link; and
         output the first video data as output video data; and
   after boot loading the second boot stage:
      the gate link is configured to enable second video data to flow from the algorithm link to the merge link; and
      the merge link is configured to:
         receive the first video data from the duplication link;
         receive the second video data from the gate link; and
         merge the first video data and the second video data to output merged video data.

2. The system of claim 1, wherein the application software is configured to use a program interface to boot load the second boot stage.

3. The system of claim 1, wherein the system is adapted to be coupled to a camera, the first boot stage further comprising:
   a capture link configured to capture video frames from the camera and output the video frames to the duplication link; and
   a display link configured to output the output of the merge link to a display device.

4. The system of claim 3, wherein the system is a rear view camera system.

5. The system of claim 4, wherein the application software is also configured to boot load a processor hosting a Controller Area Network (CAN) stack.

6. The system of claim 1, wherein the at least one first processor comprises an image processor and the at least one second processor comprises at least one of a digital signal processor or a vision processor.

7. The system of claim 1, wherein the system is an automotive safety system.

8. A method comprising:
   boot loading a first boot stage of application software of a system on at least one first processor of a multiprocessor system on a chip (SOC), wherein the first boot stage comprises:
      a duplication link;
      a gate link; and
      a merge link;
   boot loading, under control of the application software, a second boot stage of the application software on at least one second processor of the multiprocessor SOC, the second boot stage comprising an algorithm link; and
   while boot loading the second boot stage:
      blocking, by the gate link, video data from the algorithm link; and
      receiving, by a merge link, first video data from the duplication link;

outputting, by the merge link, the first video data as output video data; and after boot loading the second boot stage:
enabling, by the gate link, second video data to flow from the algorithm link to the merge link;
receiving, by the merge link, the first video data from the duplication link;
receiving, by the merge link; the second video data from the gate link; and
merging, by the merge link, the first video data and the second video data to output merged video data.

9. The system of claim 1, wherein the gate link is a first gate link, the first boot stage further comprising a second gate link configured to:
prevent the duplication link from outputting the first video data to the second boot stage while boot loading the second boot stage; and
enable the duplication link to output the first video data to the second boot stage after boot loading the second boot stage.

10. The method of claim 8, wherein boot loading the first boot stage is performed by a boot loader and the application software uses a program interface to the boot loader to boot load the second boot stage.

11. The method of claim 8, wherein the first boot stage includes functionality to capture and display video frames on a display device.

12. The method of claim 8, wherein the at least one first processor comprises an image processor and the at least one second processor comprises at least one of a digital signal processor or a vision processor.

13. The method of claim 8, wherein the system is a rear view camera system.

14. The method of claim 13, further comprising boot loading a processor hosting a Controller Area Network (CAN) stack.

15. The method of claim 8, wherein the gate link is a first gate link, the method further comprising:
preventing, by a second gate link, the duplication link from outputting the first video data to the second boot stage while boot loading the second boot stage; and
enabling, by the second gate link, the duplication link to output the first video data to the second boot stage after boot loading the second boot stage.

16. An automotive safety system comprising:
a multiprocessor system on a chip (SOC) comprising at least one first processor and at least one second processor;
a camera coupled to the multiprocessor SOC;
a memory coupled to the multiprocessor SOC, the memory storing application software partitioned into a first boot stage and a second boot stage, wherein the first boot stage is configured to capture video frames from the camera and to display the video frames on a display device and the second boot stage is configured to detect objects in the video frames; and
the first boot stage comprising:
a duplication link;
a gate link; and
a merge link is configured to:
receive first video data from the duplication link; and
output the first video data as output video data;
the first boot stage configured to boot load onto the at least one first processor; and
the second boot stage comprising an algorithm link, the second boot stage configured to boot load onto the at least one second processor;
while boot loading the second boot stage:
the gate link is configured to block video data from the algorithm link; and
the merge link is configured to output first video data from the duplication link; and
after boot loading the second boot stage:
the gate link is configured to enable second video data to flow from the algorithm link to the merge link; and
the merge link is configured to:
receive the first video data from the duplication link;
receive the second video data from the gate link; and
merge the first video data and the second video data to output merged video data.

17. The automotive safety system of claim 16, wherein the application software is configured to use a program interface to a boot loader to boot load the second boot stage.

18. The automotive safety system of claim 16, wherein the at least one first processor is an image processor and the at least one second processor comprises at least one of a digital signal processor or a vision processor.

19. The automotive safety system of claim 16, wherein the automotive safety system is a rear view camera system.

20. The automotive safety system of claim 16, wherein the gate link is a first gate link, the first boot stage further comprising a second gate link configured to:
prevent the duplication link from outputting the first video data to the second boot stage while boot loading the second boot stage; and
enable the duplication link to output the first video data to the second boot stage after boot loading the second boot stage.

* * * * *